United States Patent
Casillas et al.

(10) Patent No.: US 8,459,609 B2
(45) Date of Patent: Jun. 11, 2013

(54) BUTTERFLY VALVE ASSEMBLY INCORPORATING A UNITARY SHAFT AND BUTTERFLY PLATE VALVE ELEMENT

(75) Inventors: Larry Robert Casillas, Phoenix, AZ (US); Ed Kesner, Mesa, AZ (US); Joel LaBenz, Chandler, AZ (US); Mitch McGinty, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 727 days.

(21) Appl. No.: 12/647,686

(22) Filed: Dec. 28, 2009

(65) Prior Publication Data

US 2011/0155939 A1 Jun. 30, 2011

(51) Int. Cl.
*F16K 1/22* (2006.01)

(52) U.S. Cl.
USPC .............................. 251/308; 251/93; 251/306

(58) Field of Classification Search
USPC ...................... 251/308, 93, 305, 306; 123/337
See application file for complete search history.

(56) References Cited

U.S. PATENT DOCUMENTS

| 926,174 | A | * | 6/1909 | Clark ............................. 126/292 |
| 2,936,778 | A | * | 5/1960 | Stillwagon .................. 137/454.6 |
| 3,059,897 | A | * | 10/1962 | Jensen .......................... 251/306 |
| 4,176,823 | A | * | 12/1979 | Gliatas .......................... 251/306 |
| 4,759,530 | A | * | 7/1988 | Iff ................................... 251/306 |
| 5,005,545 | A | * | 4/1991 | Wendel et al. ................ 123/337 |
| 5,370,148 | A | * | 12/1994 | Shafer ........................ 137/15.25 |
| 5,988,341 | A | * | 11/1999 | Allen et al. ................ 192/110 B |
| 6,491,020 | B2 | | 12/2002 | Kotchi et al. |
| 6,497,245 | B1 | * | 12/2002 | Torii ......................... 137/315.11 |
| 6,986,860 | B2 | | 1/2006 | Schaefer et al. |
| 7,237,529 | B2 | | 7/2007 | Hannewald et al. |
| 7,448,593 | B2 | | 11/2008 | Lasse |
| 7,559,528 | B2 | * | 7/2009 | Gutierrez et al. ............... 251/93 |
| 8,291,885 | B2 | * | 10/2012 | Bornmann et al. ........... 123/337 |

* cited by examiner

*Primary Examiner* — John K Fristoe, Jr.
*Assistant Examiner* — Daniel Edelbrock
(74) *Attorney, Agent, or Firm* — Ingrassia Fisher & Lorenz, P.C.

(57) ABSTRACT

A butterfly valve assembly includes a unitary flow body and a unitary valve element. The unitary valve element is rotationally mounted within the flow body and includes a rotationally mounted shaft and a butterfly plate that is formed integral to the shaft. The butterfly valve assembly can withstand the maximum drive torque supplied from an associated actuator, while at the same time meeting a desired level of flow performance, and allows the unitary valve element to be installed up through the pilot bore.

7 Claims, 12 Drawing Sheets

BUTTERFLY VALVE ASSEMBLY INCORPORATING A UNITARY SHAFT AND BUTTERFLY PLATE VALVE ELEMENT

TECHNICAL FIELD

The present invention generally relates to valves, and more particularly relates to a butterfly valve assembly having an integral shaft and butterfly plate.

BACKGROUND

Valves are used in myriad systems and environments to control the flow of a fluid, and may be variously configured to implement this functionality. One exemplary type of valve that is used in some aircraft systems is a butterfly valve. A butterfly valve typically includes a flow body and a butterfly plate. The flow body includes an inner surface that defines a flow channel. The butterfly plate is mounted on a shaft and disposed within the flow channel. An actuation mechanism is coupled to the shaft and, upon supplying a torque to the shaft, causes the butterfly plate to rotate between a closed position and a plurality of open positions. The configuration of the butterfly plate and shaft are such that, at least for low-leakage and relatively high-pressure applications such as bleed air systems, the shaft is arranged to extend through the butterfly plate and across the flow channel at an angle relative to the direction of flow. This allows a suitable seal arrangement to be disposed and maintained between the butterfly plate and the flow body inner surfaces.

For some applications, a butterfly valve may also need to include a manual locking device. The manual locking device, if included, may be coupled to the end of the shaft that is opposite the end to which the actuator is coupled. When the manual locking device is included the shaft should be capable of withstanding the maximum drive torque supplied from the actuator without damaging the shaft. In some butterfly valves, a relatively large diameter shaft may be needed to meet this level of performance. A large diameter shaft may, however, deleteriously impact the flow performance through the valve when it is in its full-open position.

Hence, there is a need for a butterfly valve that can withstand the maximum drive torque supplied from an associated actuator, while at the same time meeting a desired level of flow performance. The present invention addresses at least this need.

BRIEF SUMMARY

In one exemplary embodiment, a butterfly valve assembly includes a unitary flow body and a unitary valve element. The unitary flow body includes an upper shaft bearing bore, a lower shaft bearing bore, a fluid inlet port, a fluid outlet port, and an inner surface that defines a fluid passageway between the fluid inlet port and the fluid outlet port. The unitary valve element is rotationally mounted within the flow body and includes a rotationally mounted shaft and a butterfly plate. The shaft extends through the upper shaft bearing bore, the lower shaft bearing bore, and across the fluid passageway between the fluid inlet port and the fluid outlet port. The butterfly plate is formed integral to the shaft, whereby the butterfly plate is rotatable between a closed position, in which the fluid inlet port and the fluid outlet port are at least substantially fluidly isolated from each other, and a full-open position, in which the fluid inlet port and the fluid outlet port are in fluid communication with each other.

In another exemplary embodiment, a butterfly valve assembly includes a unitary flow body, a loading slot, an upper shaft clearance, a lower shaft clearance, and a unitary valve element. The unitary flow body includes an upper shaft bearing bore, a lower shaft bearing bore, a fluid inlet port, a fluid outlet port, and an inner surface defining a fluid passageway between the fluid inlet port and the fluid outlet port. The loading slot is formed in the lower shaft bearing bore, the upper shaft clearance is formed in an inner surface of the upper shaft bearing bore, and the lower shaft clearance is formed in an inner surface of the lower shaft bearing bore. The unitary valve element is rotationally mounted within the flow body and includes a shaft and a butterfly plate. The shaft includes an upper bearing section, a lower bearing section, and a butterfly plate section between the upper bearing section and the lower bearing section. The upper bearing section and the lower bearing section each have a first diameter, and the butterfly plate section has a second diameter that is less than the first diameter. The butterfly plate is formed integral to, and extends from, the butterfly plate section of the shaft. The loading slot is dimensioned to allow the butterfly plate to be inserted through the lower shaft bearing bore and into the fluid passageway.

In yet another exemplary embodiment, a valve element adapted to be rotationally mounted within a flow body includes a shaft, a butterfly plate, a snap ring groove, and a lower bearing engagement platform. The shaft includes an upper bearing section, a lower bearing section, and a butterfly plate section between the upper bearing section and the lower bearing section. The upper bearing section and the lower bearing section each have a first diameter, and the butterfly plate section has a second diameter that is less than the first diameter. The butterfly plate is formed integral to, and extends from, the butterfly plate section of the shaft. The snap ring groove is formed in the upper bearing section of the shaft. The lower bearing engagement platform extends radially from the lower bearing section of the shaft.

Furthermore, other desirable features and characteristics of the inventive butterfly valve and valve element will become apparent from the subsequent detailed description and the appended claims, taken in conjunction with the accompanying drawings and this preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
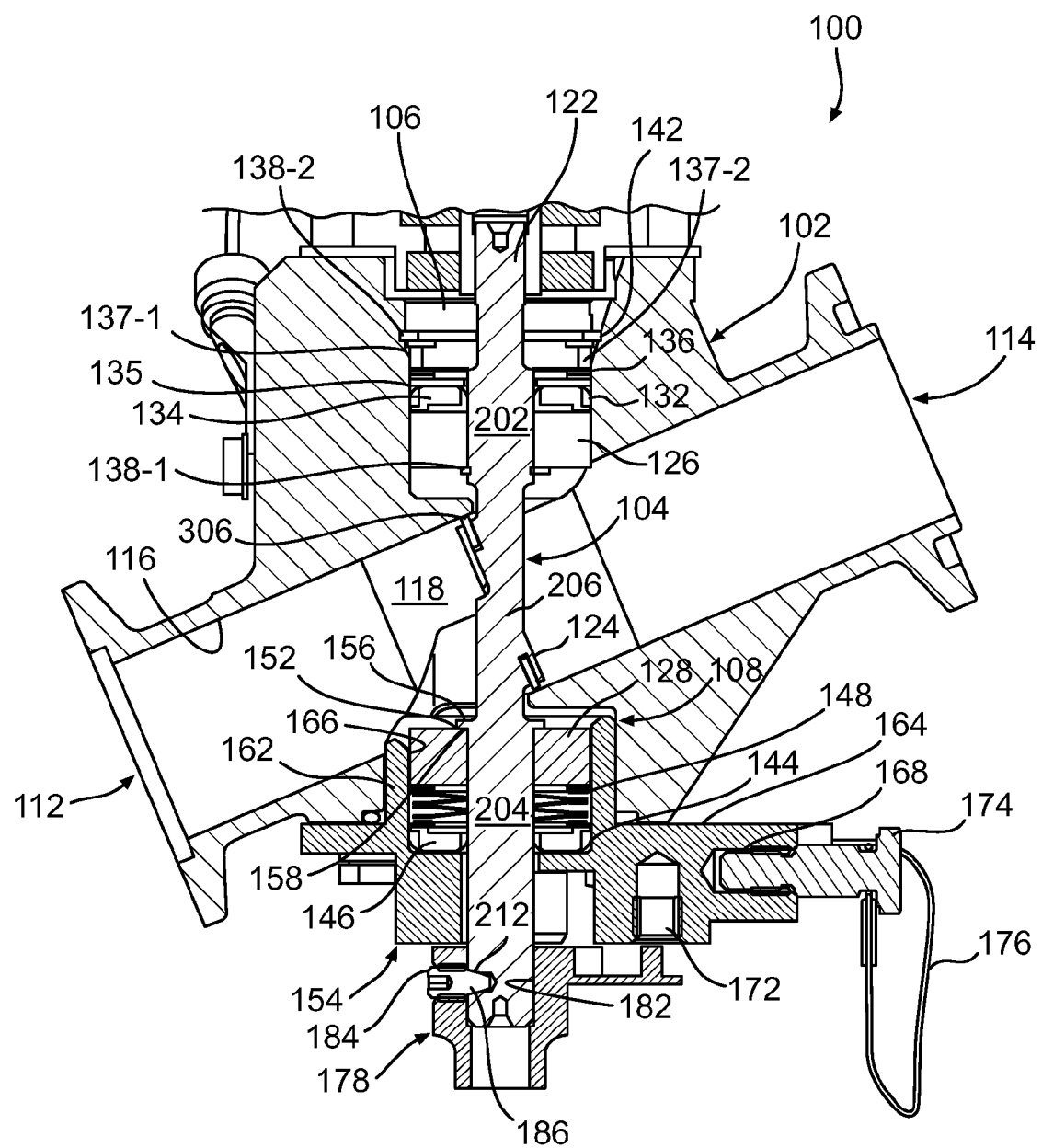
FIG. 1 depicts a cross section view of a butterfly valve assembly according to an embodiment of the present invention.

An embodiment of an exemplary butterfly valve assembly 100 is depicted in FIG. 1, and includes a flow body 102 and a valve element 104. The flow body 102 is a single, unitary structure that includes an upper shaft bearing bore 106, a pilot bore 108, a fluid inlet port 112, a fluid outlet port 114, and an inner surface 116 that defines a fluid passageway 118 between the fluid inlet port 112 and the fluid outlet port 114. The unitary flow body 102 may be formed of any one of numerous materials, including various metals, metal alloys, plastics, or composites, just to name a few. It may also be formed as the unitary structure using any one of numerous suitable processes. When the butterfly valve assembly 100 is appropriately installed within a fluid system (not-illustrated), fluid selectively flows into the fluid inlet port 112, through the fluid passageway 118, and out the fluid outlet port 114. The capability for fluid to flow into and through the flow body will depend, as may be appreciated, upon the position of the valve element 104.

The valve element 104 is also a single, unitary structure. The valve element 104 is rotationally mounted within the flow body 102, and includes a rotationally mounted shaft 122 and a butterfly plate 124 that is formed integral to the shaft 122. The shaft 122 extends through the upper shaft bearing bore 106, the pilot bore 108, and across the fluid passageway 118, and is rotationally mounted via an upper bearing 126 and a lower bearing 128. Because the butterfly plate 124 is integral to the shaft 122, when the shaft 122 rotates the butterfly plate 124 also rotates. In this regard, the butterfly plate 124 is rotatable between a closed position and a full-open position. In the closed position, which is the position depicted in FIG. 1, the fluid inlet port 112 and the fluid outlet port 114 are fluidly isolated from each other (or at least substantially fluidly isolated from each other). In the full-open position (or any other open position, for that matter), the fluid inlet port and the fluid outlet port are in fluid communication with each other.

Before proceeding further it is noted that the fluid flow rate through the flow body 102 may be at least somewhat controlled by appropriately positioning the valve element 104. In some implementations, the valve element 104 is rotated between the closed position and a single, full open position, rather than one or more of a plurality of intermediate open positions. In other implementations the valve element 104 may be moved to one or more intermediate open positions, if needed or desired.

Figure 2:
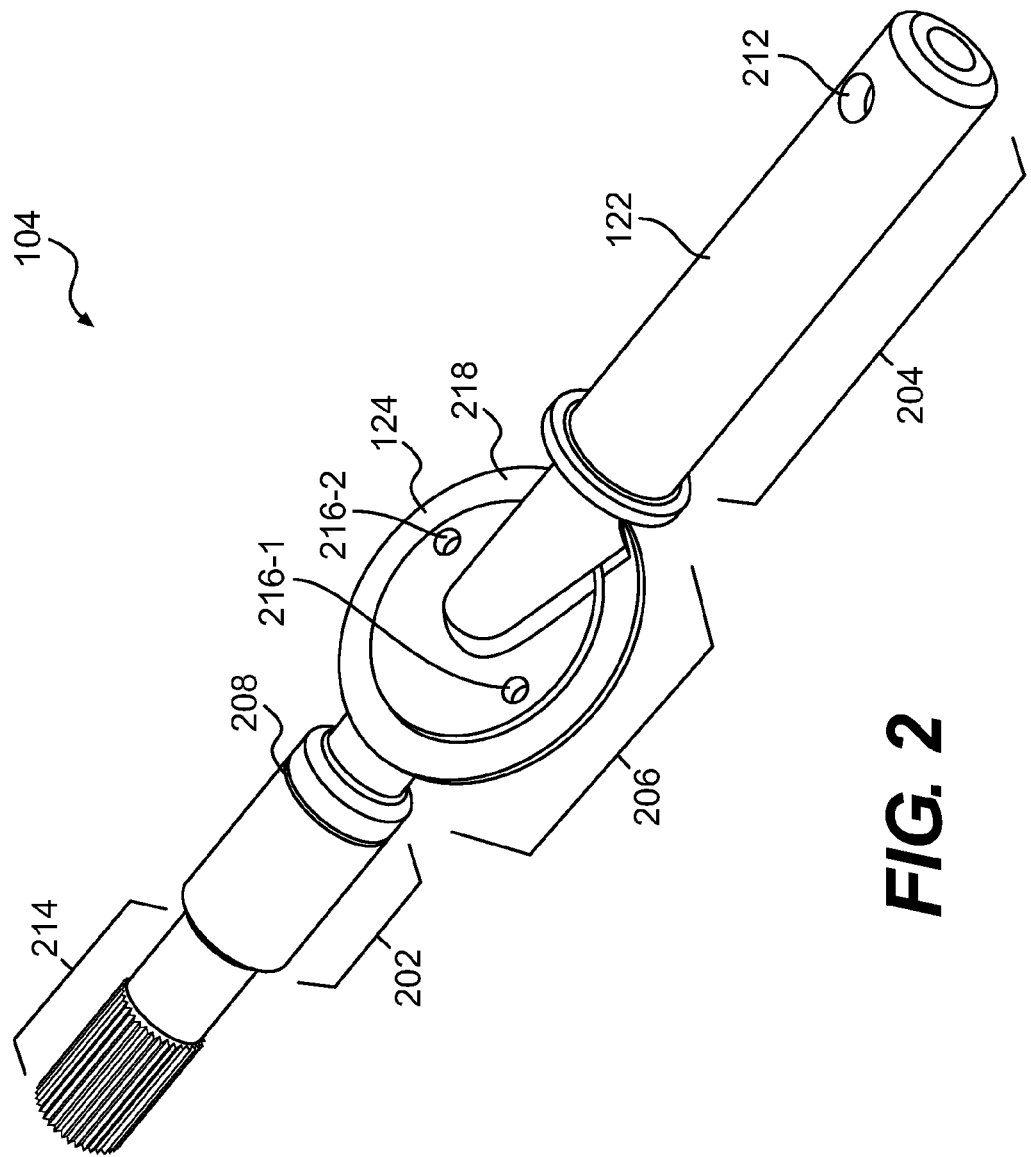
FIG. 2 depicts an exemplary unitary valve element that may be used to implement the valve assembly of FIG. 1.
Figure 3:
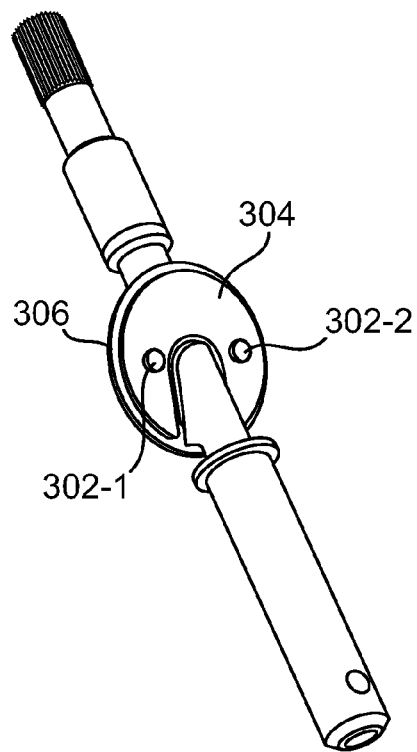
FIGS. 3-9 depict various views of the unitary valve element of FIG. 2 (or portions thereof) and various components that are coupled thereto.
Figure 4:
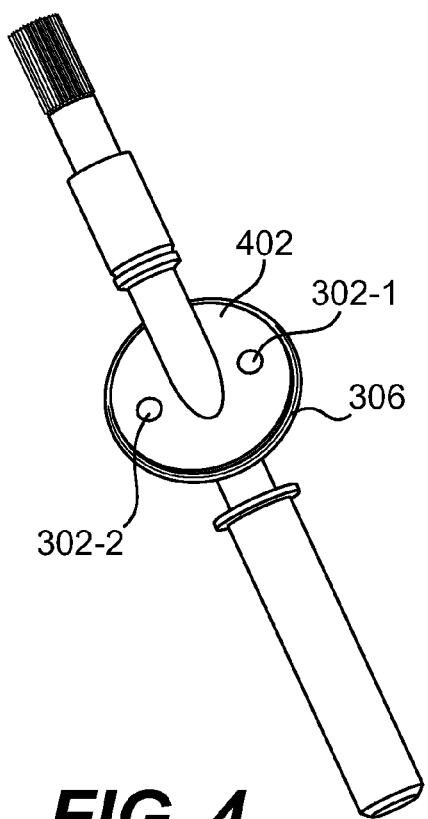

Turning now to FIGS. 2-4, which depict various perspective views of the valve element 104, it may be seen that the shaft 122 includes an upper bearing section 202, a lower bearing section 204, and an interposed butterfly plate section 206. The upper bearing section 202 and the lower bearing section 204 each have a first diameter. The butterfly plate section 206, on which the butterfly plate 124 is integrally formed, has a second diameter that is less than the first diameter. The first and second diameters are large enough to ensure the shaft 122 can withstand the maximum drive torque supplied from a non-illustrated actuator. In addition, the second diameter is sufficiently small to ensure adequate flow performance when the butterfly plate 124 is in the full-open position.

As FIG. 2 additionally depicts, the shaft 122 further includes a first snap ring groove 208, a positioning hole 212, and an actuator interface section 214. The first snap ring groove 208 is formed in the upper bearing section 202 and is configured to receive a first snap ring (not shown in FIG. 2). As will be described further below, this first snap ring is used to support various hardware disposed within the upper shaft bearing bore 106. The positioning hole 212, as will also be described further below, is configured to receive a suitable fastener (also not shown in FIG. 2), such as a setscrew, which is used to couple a manual lock mechanism 178 (see FIG. 1) to the shaft 122. The actuator interface section 214 is configured to interface with an actuator. In the depicted embodiment the actuator interface section 214 includes a plurality of splines. It will be appreciated, however, that this is merely exemplary of one suitable actuator interface configuration, and that various others may be used.

It is additionally seen that two openings 216 (216-1, 216-2) are formed in the integral butterfly plate 124. These openings, as shown more clearly in FIGS. 3 and 4, are each configured to receive a suitable fastener, which in the depicted embodiment are a pair of rivets 302 (302-1, 302-2). The rivets 302 extend one each through the openings 216, and are used to couple a backing plate 304 to the butterfly plate 124. In particular, the butterfly plate 124 includes a first (or upstream) face 218 (see FIG. 2) and a second (or downstream) face 402 (see FIG. 4). A seal ring 306 is disposed against the first face 218 and is held in place by the backing plate 304.

Figure 5:
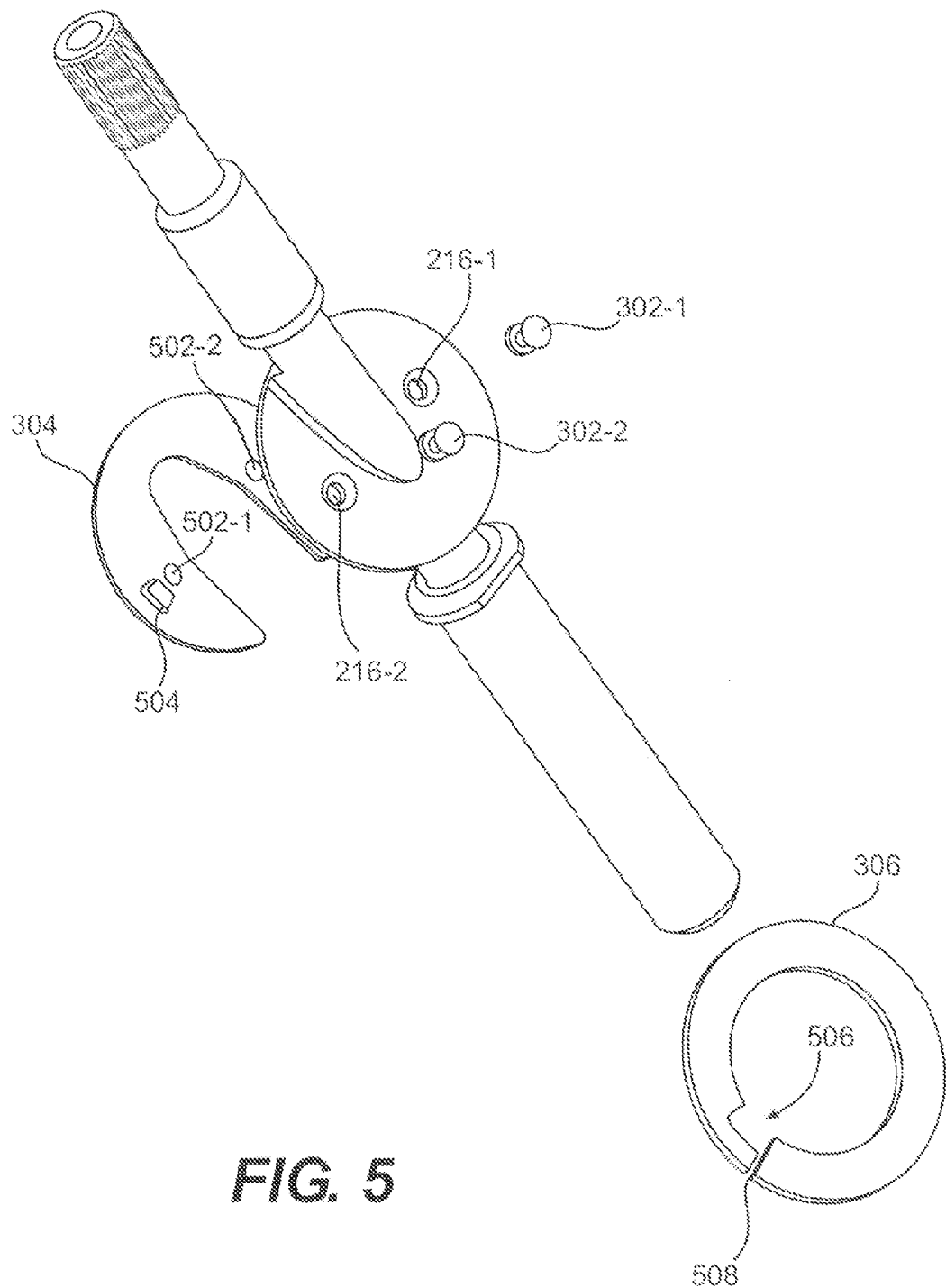
Figure 6:
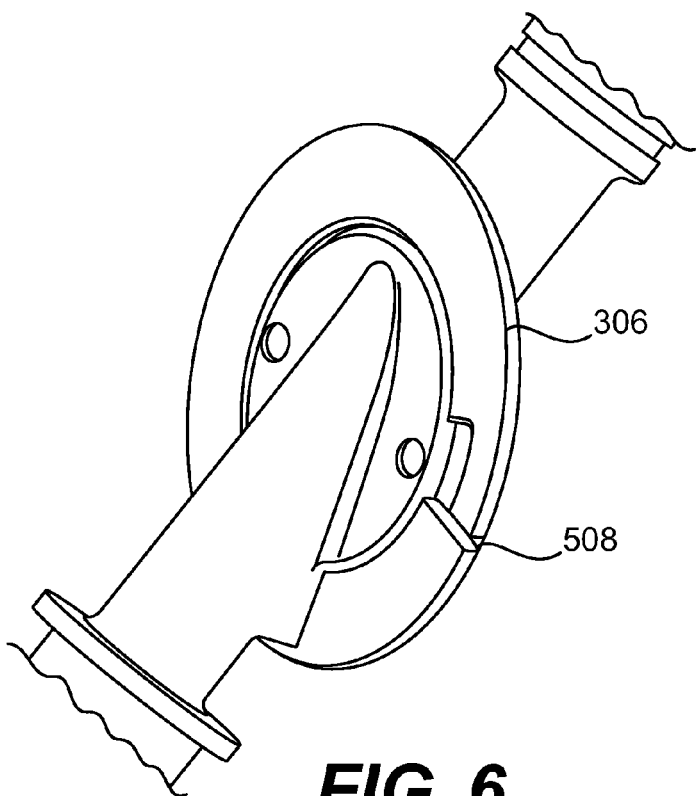
Figure 7:
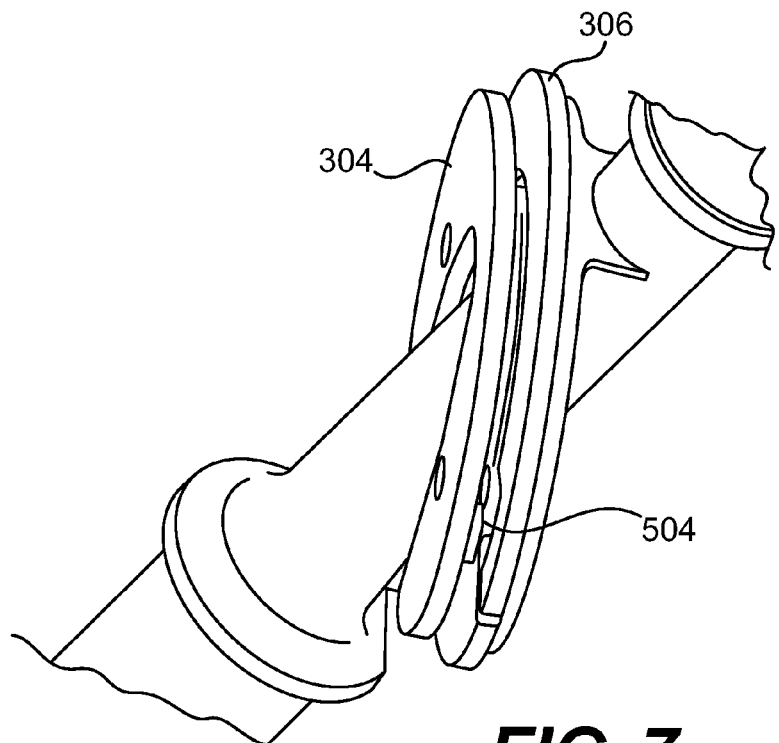
Figure 8:
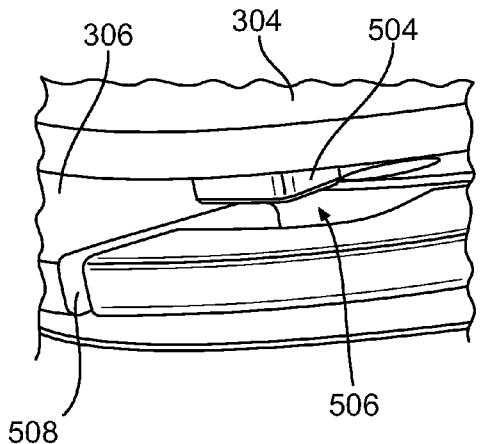
Figure 9:
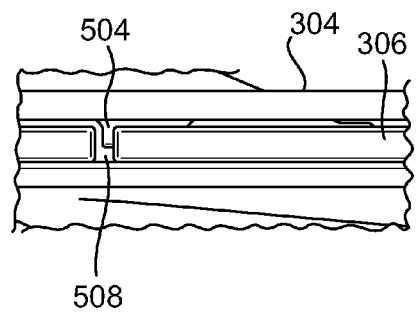

More specifically, and with reference now to FIG. 5, it is seen that the backing plate 304 includes two openings 502 (502-1, 502-2) that, when the backing plate 304 is properly positioned, are collocated with the two openings 216 formed in the butterfly plate 124. Thus, the rivets 302 also extend through the backing plate openings 502. The backing plate 304 additionally includes an anti-rotation protrusion 504. The anti-rotation protrusion 504 engages an anti-rotation notch 506 that is formed in the seal ring 306. As FIG. 5 also shows, the seal ring 306 further includes a slit 508. The slit 508 allows the seal ring 306 to accommodate thermal expansion and design tolerances. Then, as shown most clearly in FIGS. 7-9, when the backing plate 304 is appropriately positioned against the seal ring 306, the anti-rotation protrusion 504 and anti-rotation notch 506 cooperate to prevent undesirable rotation of the seal ring 306. The outer diameter of the seal ring 306 is greater than that of the butterfly plate 124 and, as may be seen by referring back to FIG. 1, engages the inner surface 116 of the flow body 102.

With continued reference to FIG. 1, various additional features of the butterfly valve assembly 100 will now be described. In particular, it may be seen that the upper shaft bearing bore 106 and the pilot bore 108 each house the hardware that rotationally mount the valve element 104. Specifically, in addition to the upper bearing 126, an upper seal 132, an upper seal retainer 134, an upper retainer 135, one or more shims 136, and a pair of washers 137 (137-1, 137-2) are disposed in the upper shaft bearing bore 106 and are held in place between two snap rings 138 (138-1, 138-2). The first snap ring 138-1, as was alluded to above, is disposed within the above-described first snap ring groove 208, and the second snap ring 138-2 is disposed within a second snap ring groove 142 that is formed in the upper shaft bearing bore 106. The upper bearing 126 engages the upper shaft bearing bore 106 and the upper bearing section 202 of the shaft 122 and allows the shaft 122 to rotate relative to the flow body 102. The upper seal 132 provides a substantially fluid-tight seal around the upper bearing section 202 of the shaft 122. The upper seal retainer 134 retains the upper seal 132 in place, and upper retainer 135 isolates the upper seal 132 and upper seal retainer 134 from the shims 136. The shims 136 are used to provide appropriate retaining structure between the washers 137, the second snap ring 138-2, and the upper retainer 135. It will be appreciated that additional or different hardware for rotationally mounting the shaft 122 may be disposed within the upper shaft bearing bore 106. The depicted hardware is merely exemplary of a particular preferred embodiment.

Disposed within the pilot bore 108 is the lower bearing 128, a lower seal 144, a lower seal retainer 146, and a preload spring 148, all of which are held in place between a lower bearing engagement platform 152 and a lower bearing cover 154. The lower bearing engagement platform 152 is formed integral to the shaft 122 and extends radially outward therefrom. The lower bearing engagement platform 152 has an outer diameter that is greater than the diameter of the lower bearing section 204 of the shaft 122, and includes an upper surface 156 and a lower surface 158. The lower surface 158 engages the lower bearing 128.

The lower bearing 128, in addition to engaging the lower bearing engagement platform 152, engages the lower bearing section 204 and an inner surface 166 of the lower bearing cover 154, and allows the shaft 122 to rotate relative to the flow body 102. The lower seal 144 provides a substantially fluid-tight seal around the lower bearing section 204 of the shaft 122, and the lower seal retainer 146 is used to retain the lower seal 144 in place. The preload spring 148 is disposed between the lower bearing 128 and the lower seal retainer 146, and provides an appropriate preload force to the upper 126 and lower 128 bearings.

The lower bearing cover 154 is coupled to the flow body 102 and includes a housing section 162 and a lock section 164. The housing section 162 surrounds the shaft 122 and extends into the pilot bore 108. The housing section 162 includes the above-mentioned inner surface 166, which defines a volume within which the lower bearing 128, lower seal 144, lower seal retainer 146, and preload spring 148 are all disposed. The lock section 164 extends from the housing section 162 and has a lock pin stowage opening 168 and a manual lock opening 172 formed therein. A lock pin 174, which may be movably coupled to the flow body 102 via, for example, a lanyard 176, is configured to be selectively inserted into the lock pin stowage opening 168, as depicted in FIG. 1, or into the manual lock opening 172. When the lock pin 174 is inserted into the manual lock opening 172, it is also preferably inserted into and through the previously-mentioned manual lock mechanism 178.

The manual lock mechanism 178 is coupled to the shaft 122, and more particularly to the end of the shaft 122 that is opposite the actuator interface section 214 and that includes the previously described positioning hole 212. The manual lock mechanism 178 includes an inner surface 182 that defines a sleeve that surrounds a portion of the lower bearing section 204 of the shaft 122. The manual lock mechanism 178 further includes a threaded fastener opening 184 that, when aligned with the positioning hole 212 in the shaft 122, allows a fastener 186, such as the depicted setscrew, to be threaded therethrough and into the positioning hole 212. Thus, the manual lock mechanism 178 rotates with the shaft 122.

Figure 10:
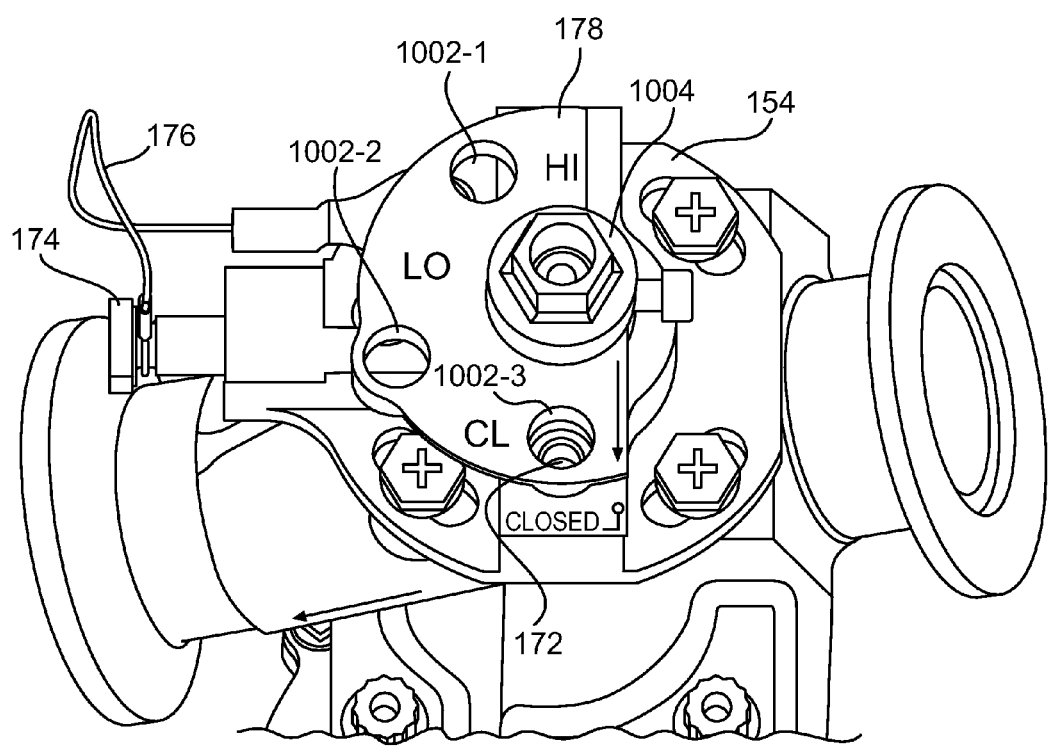
FIG. 10 depicts a bottom perspective view of the valve assembly of FIG. 1, more clearly illustrating a manual lock mechanism.

As FIG. 10 depicts, a plurality of lock position openings 1002 (1002-1, 1002-2, 1002-3) are formed in the manual lock mechanism 178 and, depending upon the rotational position of the shaft 122, may be aligned with the manual lock opening 172 in the lower bearing cover 154. When a lock position opening 1002 is aligned with the manual lock opening 172, the lock pin 174 may be inserted through the lock position opening 1002 and into the manual lock opening 172, to thereby lock the valve element 104 in that position. Although the depicted manual lock mechanism 178 includes three lock position openings 1002, which correspond to the closed position and two intermediate positions, it will be appreciated that more or less than this number of lock position openings 1002 could be included, and that different valve positions could also be included. The manual lock mechanism 178, at least in the depicted embodiment, is also configured with a hex feature 1004. The hex feature 1004 allows an operator to manually move the valve element 104, using an appropriate tool, to any of the lockable positions.

Figure 11:
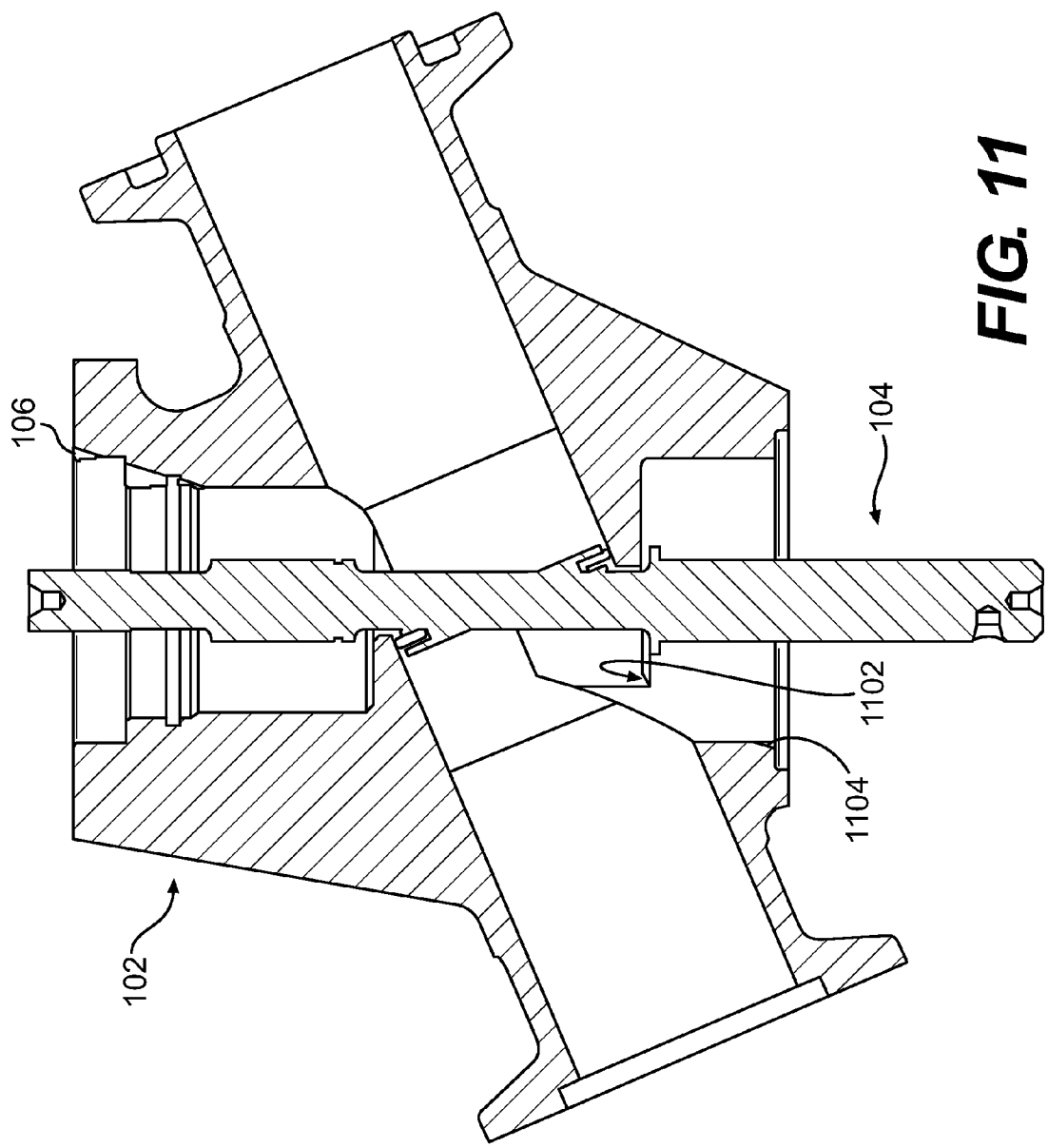
FIGS. 11 and 12 depict different cross section views an exemplary flow body and valve element that may comprise the valve assembly of FIG. 1, showing various features that facilitate assembly.
Figure 12:
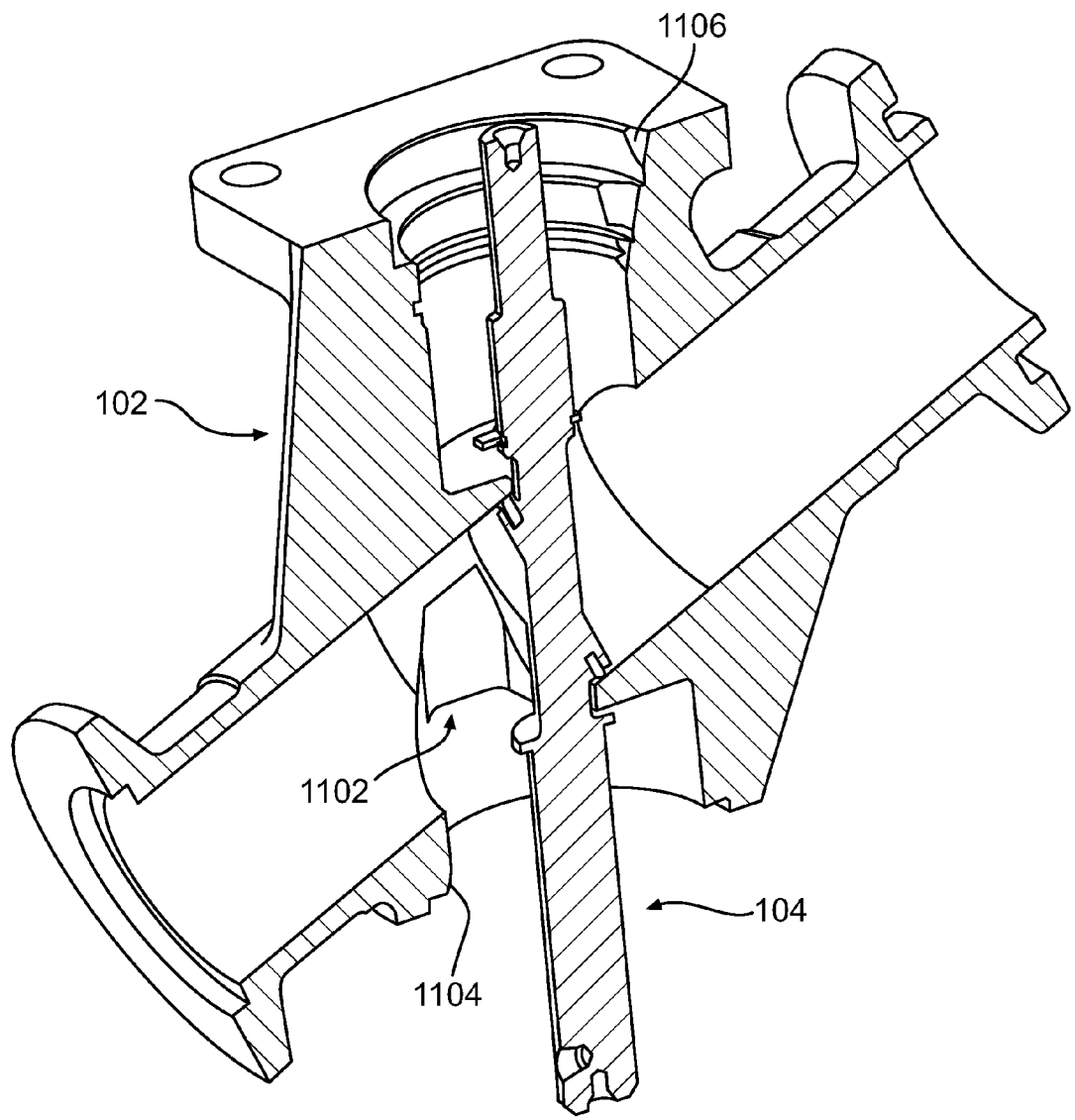
Figure 13:
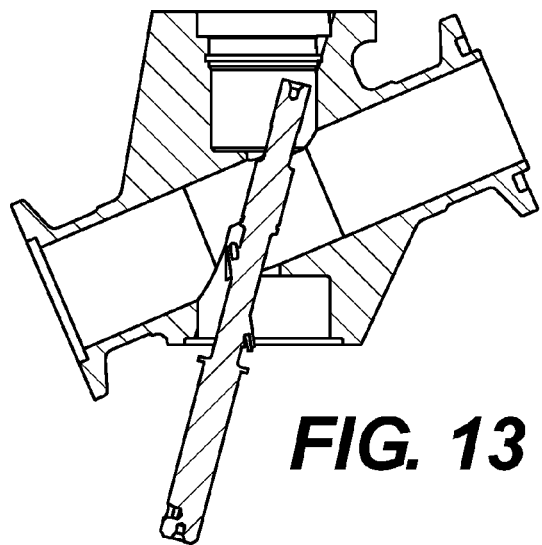
FIGS. 13-24 depict different cross section views of the exemplary flow body and valve element of FIGS. 11 and 12, showing various stages of installation of the valve element into the flow body.
Figure 14:
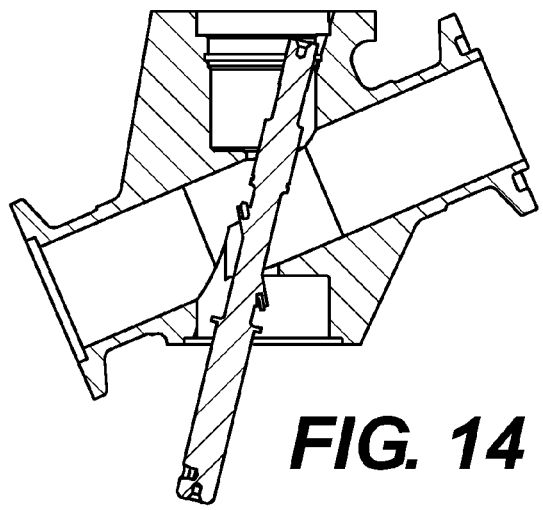
Figure 15:
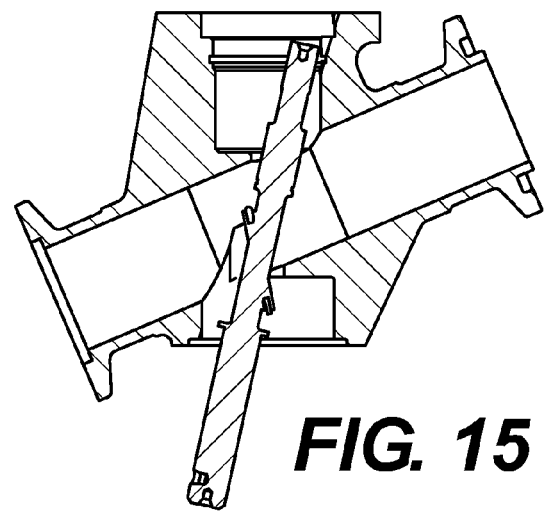
Figure 16:
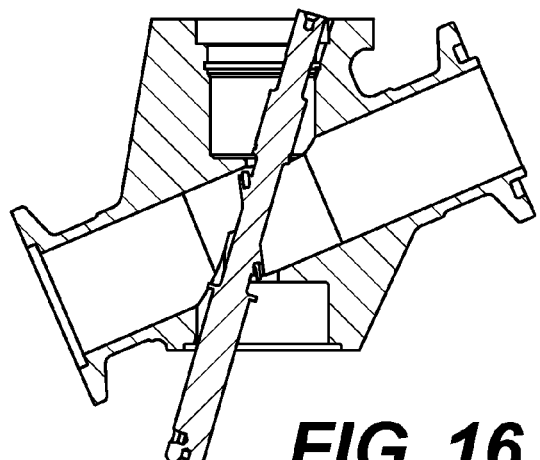
Figure 17:
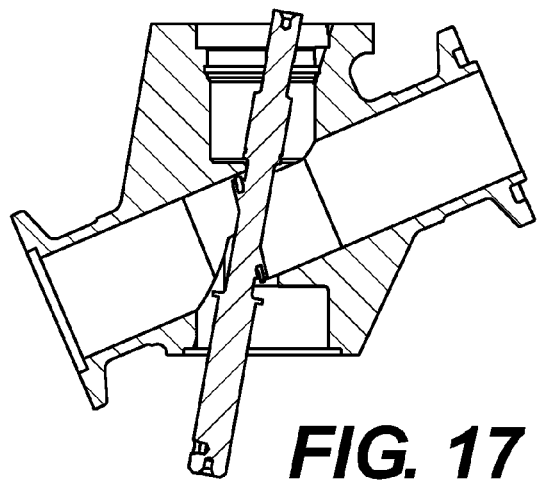
Figure 18:
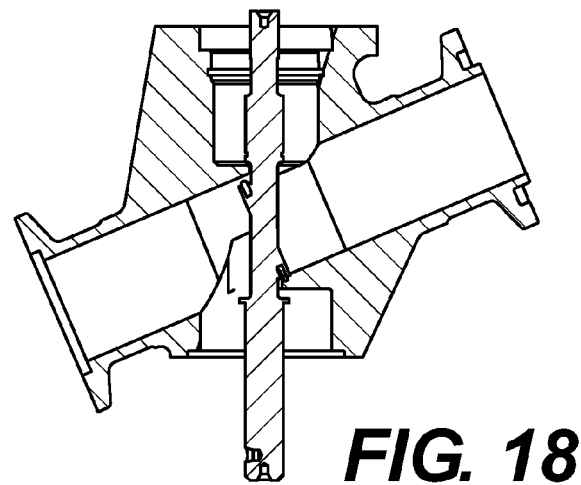
Figure 19:
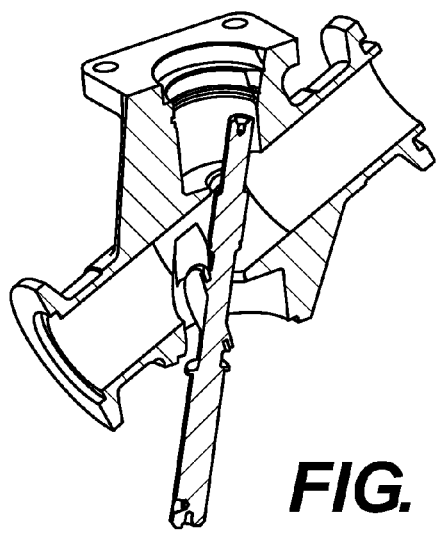
Figure 20:
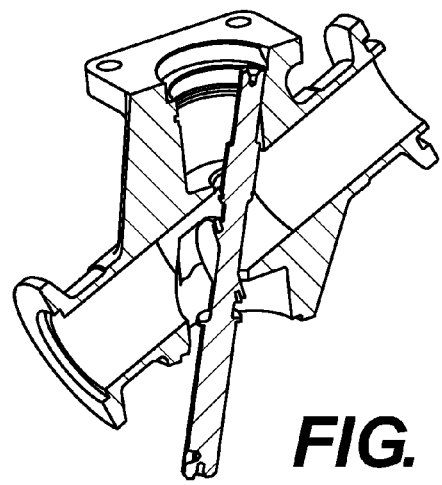
Figure 21:
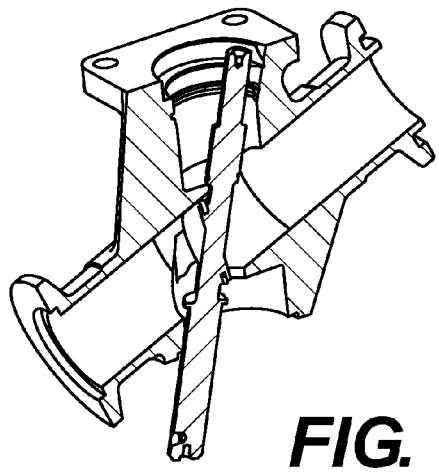
Figure 22:
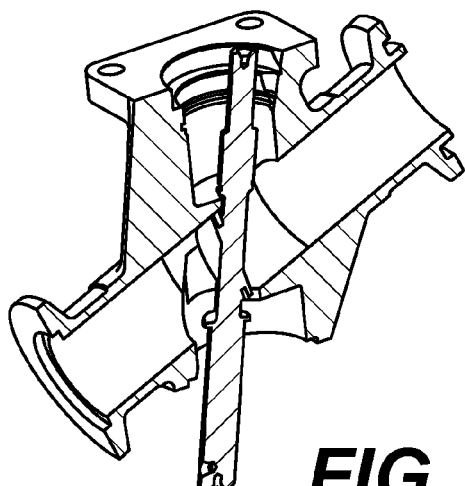
Figure 23:
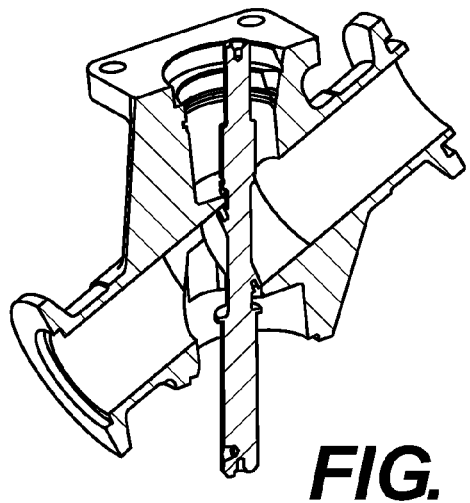
Figure 24:
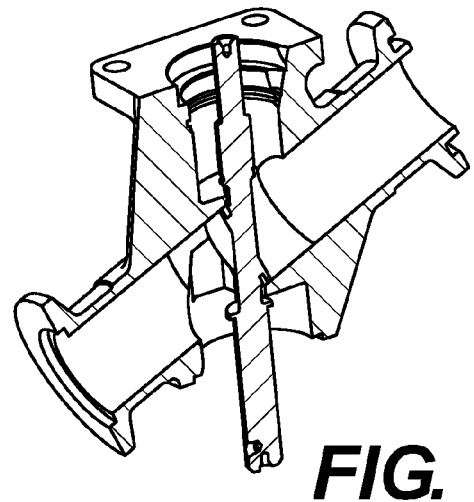

In order to facilitate installation of the unitary valve element 104 into the flow body 102, while still being able to withstand the maximum actuator drive torque and ensure adequate flow performance, the flow body 102 includes various additional structural features. In particular, and with reference now to FIGS. 11 and 12, a loading slot 1102 and a lower shaft clearance 1104 are formed in the pilot bore 108, and an upper shaft clearance 1106 is formed in the upper shaft bearing bore 106. The loading slot 1102 is dimensioned to allow the butterfly plate 124 to be inserted through the pilot bore 108 and into the fluid passageway 118. The lower and upper shaft clearances 1104, 1106 are disposed and dimensioned to facilitate valve element 104 insertion into the flow body 102. In particular, as FIGS. 13-24 depict, these clearances 1104, 1106 facilitate valve element insertion by providing sufficient clearances for the shaft 122, when needed, at various stages of valve element 104 installation and, when needed, valve element 104 removal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A butterfly valve assembly, comprising:
  a unitary flow body including an upper shaft bearing bore, a lower shaft bearing bore, a fluid inlet port, a fluid outlet port, and an inner surface defining a fluid passageway between the fluid inlet port and the fluid outlet port, the fluid passageway configured such that fluid flows therethrough in a flow direction;
  a loading slot formed in the lower shaft bearing bore;
  an upper shaft clearance formed in an inner surface of the upper shaft bearing bore;
  a lower shaft clearance formed in an inner surface of the lower shaft bearing bore; and
  a unitary valve element rotationally mounted within the flow body, the valve element including:
    a rotationally mounted shaft extending through the upper shaft bearing bore, the lower shaft bearing bore, and across the fluid passageway between the fluid inlet port and the fluid outlet port at a non-perpendicular angle relative to the flow direction, and
    a butterfly plate formed integral to, and extending from, the butterfly plate section of the shaft at a non-zero angle relative to the shaft, the butterfly plate rotatable with the shaft between a closed position, in which the butterfly plate is disposed perpendicular to the flow direction and thus the fluid inlet port and the fluid outlet port are at least substantially fluidly isolated from each other, and a full-open position, in which the fluid inlet port and the fluid outlet port are in fluid communication with each other, wherein the loading slot is dimensioned to allow the butterfly plate to be inserted through the lower shaft bearing bore and into the fluid passageway.

2. The valve assembly of claim 1, wherein the butterfly plate includes a first face and a second face, and wherein the valve assembly further comprises:

a backing plate coupled to the butterfly plate;

a seal ring disposed between the first face and the backing plate, the seal ring engaging extending radially from the butterfly plate and engaging the inner surface of the flow body; and a plurality of rivets extending through the backing plate and the butterfly plate to couple the backing plate to the butterfly plate.

3. The valve assembly of claim 1, wherein:

the shaft includes an upper bearing section, a lower bearing section, and a butterfly plate section, the butterfly plate section between the upper bearing section and the lower bearing section;

the upper bearing section and the lower bearing section each have a first diameter; and the butterfly plate section has second diameter that is less than the first diameter.

4. The valve assembly of claim 3, further comprising:

a first snap ring groove formed in the upper bearing section;

a second snap ring groove formed in the upper bearing bore of the flow body;

a first snap ring disposed within the first snap ring groove;

a second snap ring disposed within the second snap ring groove;

an upper bearing disposed within the upper shaft bearing bore between the first snap ring and the second snap ring and engaging the upper bearing section of the shaft; and a lower bearing disposed within the lower shaft bearing bore and engaging the lower bearing section of the shaft.

5. The valve assembly of claim 4, further comprising:

a lower bearing cover coupled to the flow body and disposed at least partially within the lower shaft bearing bore, the lower bearing cover engaging at least a portion of the lower bearing;

a manual lock opening formed in the lower bearing cover;

a manual lock mechanism coupled to the shaft external of the flow body, the manual lock mechanism including a plurality of lock position openings extending therethrough, the manual lock mechanism rotatable with the shaft whereby each lock position opening may be selectively aligned with the manual lock opening;

a lock pin stowage opening formed in the lower bearing cover; and a lock pin movably coupled to the flow body and configured to be selectively inserted into the lock pin stowage opening or through one of the lock position openings that is aligned with the manual lock opening.

6. A valve element adapted to be rotationally mounted within a flow body, the valve element comprising:

a shaft including an upper bearing section, a lower bearing section, and a butterfly plate section between the upper bearing section and the lower bearing section, the upper bearing section and the lower bearing section each having a first diameter, the butterfly plate section having a second diameter that is less than the first diameter;

a butterfly plate formed integral to, and extending from, the butterfly plate section of the shaft at a non-zero angle relative to the shaft, the butterfly plate including a first face and a second face;

a backing plate coupled to the butterfly plate, the backing plate including an anti-rotation protrusion extending from a surface thereof;

a seal ring disposed between the first face and the backing plate and including an anti-rotation notch, the anti-rotation notch engaging the anti-rotation protrusion and extending radially from the butterfly plate;

a snap ring groove formed in the upper bearing section of the shaft; and a lower bearing engagement platform extending radially from the lower bearing section of the shaft.

7. The valve element of claim 6, further comprising:

a plurality of rivets extending through the backing plate and the butterfly plate to couple the backing plate to the butterfly plate.

* * * * *